United States Patent [19]
Yuen

[11] 3,927,486
[45] Dec. 23, 1975

[54] PORTABLE ANGLING ASSEMBLY

[76] Inventor: Kerry Yuen, 17 Crawson Bay, Winnipeg, Manitoba, Canada

[22] Filed: June 28, 1974

[21] Appl. No.: 484,125

[52] U.S. Cl. ..................................... 43/20; 43/23
[51] Int. Cl.² .................. A01K 87/00; A01K 89/00
[58] Field of Search ....... 43/23, 18, 20; 242/84.2 R, 242/84.2 A

[56] References Cited
UNITED STATES PATENTS

| | | | |
|---|---|---|---|
| 2,239,227 | 4/1941 | Gunnufson | 43/23 |
| 2,613,468 | 10/1952 | Hand | 43/20 |
| 3,447,254 | 6/1969 | Sobel et al. | 43/20 |

Primary Examiner—Warner H. Camp
Attorney, Agent, or Firm—Stanley G. Ade

[57] ABSTRACT

The present device comprises a moulded casing having a reel assembly enclosed therein and having a handle portion formed integrally therewith and extending rearwardly from the reel portion. A telescopic rod assembly is carried within the upper portion of the casing and can be extended therefrom thus providing a flexible rod when extended. Means are provided in the upper rear portion of the casing and handle to store the hook and other elements of the fishing equipment which are attached to the reel and extend through the rod ferrules. The rod carrying portion can be detached from the casing if desired and to provide access to the storage part of the handle.

7 Claims, 8 Drawing Figures

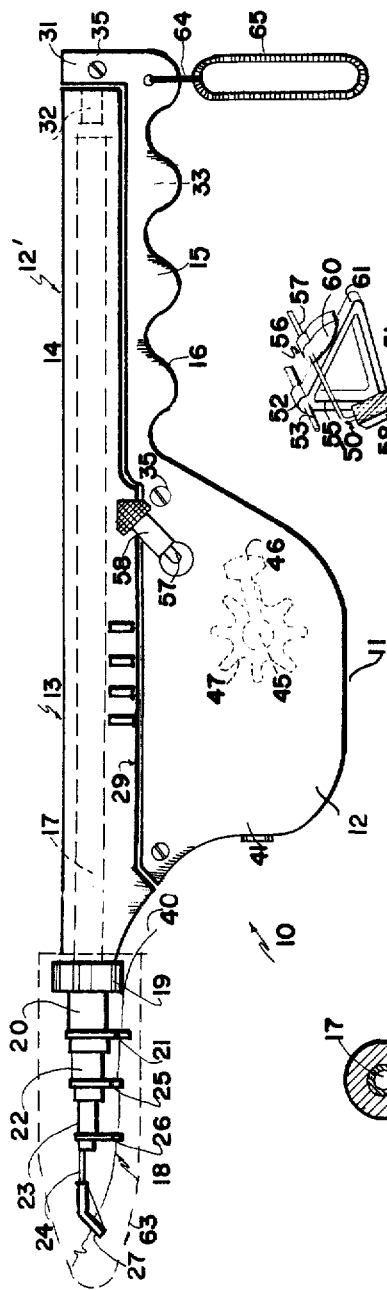
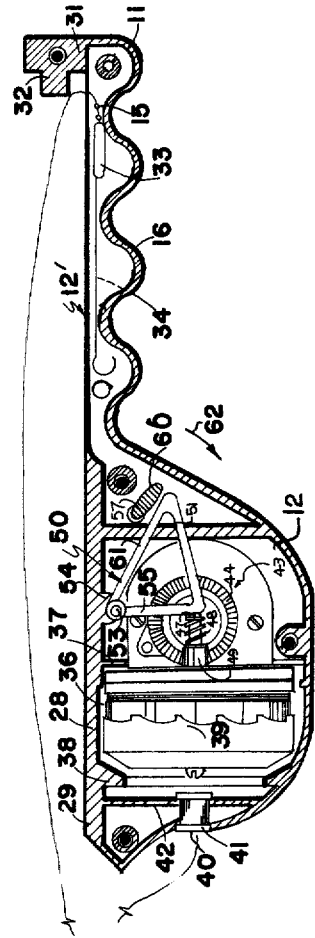
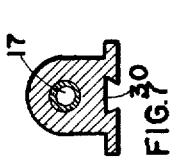
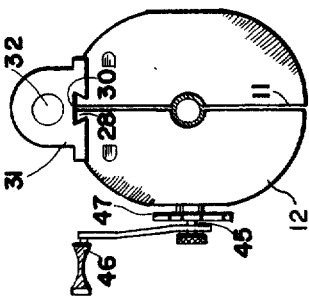

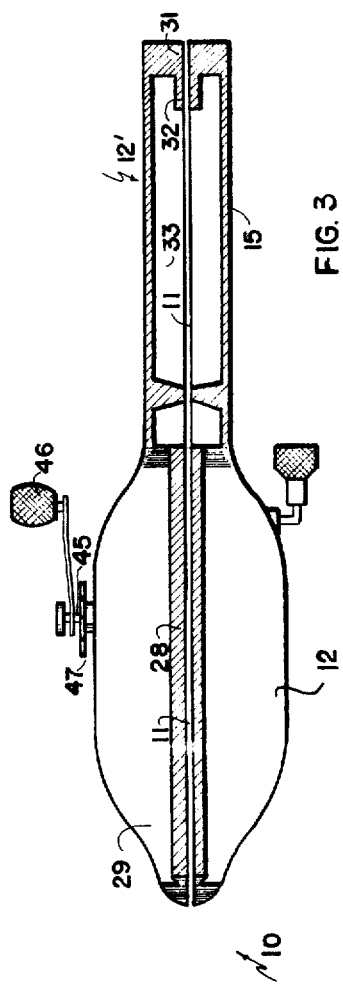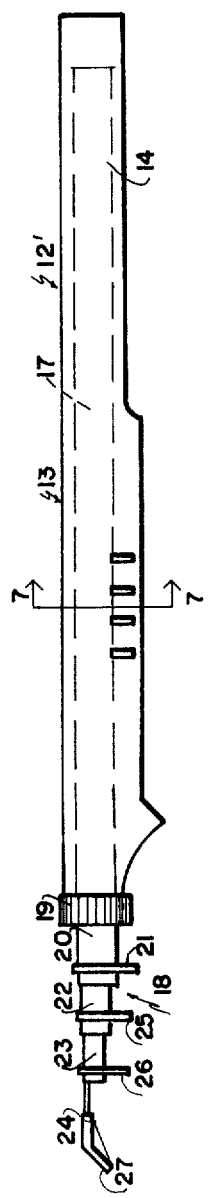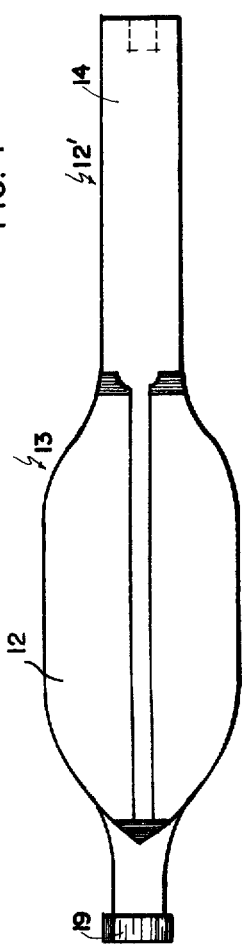

PORTABLE ANGLING ASSEMBLY

BACKGROUND OF THE INVENTION

It is desirable that fishing rods be relatively long and flexible in order to provide good casting facilities and to give the necessary flexibility when playing a fish hooked by the assembly. Conventionally, fishing rods are usually manufactured from reinforced glass fibers or from metal. The handle end of the rod is usually provided with facilities to detachably secure a reel assembly thereto.

Some of these rods can be disconnected along the length thereof for two or three portions for transportation and storage and other rods, particularly metal rods, are sometimes telescopic so that they can be collapsed downwardly to a shorter length. However, even the best of these telescopic rods is relatively long when in the telescoped position because the main portion of the rod has to be long enough to contain the other collapsed elements so that it is still awkward to store and transport. Furthermore, the reel either has to be detached and stored separately or is exposed to damage during storage and transportation.

SUMMARY OF THE INVENTION

The present invention overcomes all of these disadvantages by providing a moulded plastic enclosure within which a conventional spinning reel assembly or the like is mounted for normal operation. A handle is moulded as part of the enclosure and extends rearwardly therefrom and a rod carrying portion forms part of the enclosure and is detachably secured thereto along the underside of the enclosure and also the upper part of the handle.

A telescopic rod assembly is carried within this rod carrying portion which enables the rod assembly to be telescoped into the rod carrying portion so that the overall length of the assembly, when closed, is substantially equal to the overall length of the enclosure and handle.

When extended, a fully flexible rod is provided together with a spinning reel which can be used for casting, stillfishing and trolling as desired.

One of the difficulties of providing an assembly of this type is due to the release mechanism of conventional spinning reels normally being situtated on the upper side of the reel. Depression of the release button moves the release pin of the reel axially and comprises a relatively simple lever mechanism.

With the rod carrying assembly being situtated on the upper part of the enclosure, it is impossible for a conventional reel release lever to be utilized.

In the present device, a novel arrangement is provided which enables a release lever extending from one side of the casing, to be depressed and to move the release pin axially thus releasing the reel in the usual way.

The principal object and essence of the invention is to provide an angling device of the character herewithin described which is completely self-contained within a moulded plastic casing and which includes a telescopic rod assembly within the upper part of the casing and which can be extended partly or fully as desired.

Another object of the invention is to provide a device of the character herewithin described which includes a novel reel release mechanism operated by a lever extending from one side of the casing.

Another object of the invention is to provide a device of the character herewithin described which includes a storage compartment within the handle for the storage of ancilliary fishing equipment.

Still another object of the invention is to provide a device of the character herewithin described in which the rod assembly can be partially or fully extended depending upon the type of fishing being undertaken.

Another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation of the device with certain parts shown in phantom.

FIG. 2 is a view similar to FIG. 1, but with one side of the casing removed and with the rod carrying portion detached.

FIG. 3 is a top plan view of FIG. 2, but with the casing in position.

FIG. 4 is a side elevation of the reel carrying portion and the upper part of the handle.

FIG. 5 is an underside view of FIG. 4.

FIG. 6 is an enlarged isometric view of the reel release assembly.

FIG. 7 is a cross sectional view along the lines 7—7 of FIG. 4.

FIG. 8 is a front end elevation of FIG. 3 taken from the left hand side thereof with respect to the drawings.

In the drawings like characters of reference indicate corresponding parts in the different figures.

DETAILED DESCRIPTION

Proceeding therefore to describe the invention in detail, reference character 10 illustrates generally, a moulded plastic casing or enclosure formed in two halves and joined along the longitudinal axis indicated by reference character 11.

The casing includes an enlarged reel carrying portion collectively designated 12, a handle portion collectively designated 12' and a rod carrying portion collectively designated 13.

The handle portion 12' includes an upper part 14 and a lower part 15 with the lower part 15 extending rearwardly from the reel carrying portion 12 and being moulded integrally therewith. In this connection, the under side of the lower part 15 is formed with alternate depressions and extending curved portions to act as finger engaging configurations as indicated by reference character 16.

The rod carrying portion 13 which includes the aforementioned part 14 of the handle portion 12', is provided with a longitudinal bore 17 formed therethrough and a telescopic rod assembly collectively designated 18 is fitted within this longitudinal bore and extends from the front end 19 of the rod carrying portion 13. In this embodiment, it includes a main tubular member 20 which is fixed within the bore 17 and is provided with a ferrule 21 on the extending end thereof which depends downwardly therefrom as clearly shown in the drawings.

First, second and third telescopic portions 22, 23 and 24 fit one within the other and also within the tubular portion 20 and are also provided with ferrules 25, 26 and 27 respectively, on the distal ends thereof and also depending downwardly as clearly shown.

Each of these portions 22, 23 and 24 are telescopically engaged one within the other and may either be fully extended (not illustrated) or partly extended depending upon fishing conditions and the desires of the operator.

When fully extended, the sections being flexible, provide the desirable flexible action to the rod, but when used for example, for trolling or for still fishing, it may not be desirable or necessary to extend all of the sections fully so that one or more of these sections may be partly extended and will remain fixed in the extended position by the frictional engagement of one section with the other whereupon fishing may be continued in the usual way.

An important function of the telescopic sections is the fact that they are frictionally held one within the other for sliding relative movement and can be used in the partially extended position without inadvertent longitudinal movement occurring between one or the other.

Means are provided on the upper side of the casing or enclosure 10 to detachably connect the rod carrying portion 13 thereto.

A rib 28 is formed on the upper side 29 of the enclosure and extends longitudinally thereof, said rib being wedge-shaped in cross section as clearly shown in FIG. 8. It will be appreciated that part of this rib is formed on one side of the enclosure and the other part on the other so that when the parts of the enclosure are secured together along the longitudinal axis 11, the full wedge-shaped rib is formed.

A corresponding groove 30 is formed on the under side of the rod carrying portion 13, said groove also being wedge-shaped in cross section and the rib 28 is adapted to engage the groove 30 so that the rod carrying portion can be slid into engagement with the enclosure 10 to take up the position shown in FIG. 1.

When engaged as shown in FIG. 1, the upper part 14 of the handle portion 12' overlies the lower part 15 and completes the handle portion as illustrated. In this regard, an extension 31 is formed on the rear end of the lower part 15 of the handle and is provided with a stud 32 extending forwardly therefrom which is adapted to engage within the rear end of the bore 17 of the upper part 14 thus locating and anchoring the upper part 14 to the lower part 15.

The lower part 15 is also formed with a hollow configuration thus providing a storage recess 33 within which ancilliary fishing equipment may be stored as shown in phantom by reference character 34 in FIG. 2.

When the two halves of the enclosure 10 are secured together as by screws 35, a substantially annular recess 36 is formed between ribs 37 and 38 within which a conventional spinning reel assembly 39 is held as shown in FIG. 2.

Fishing line 40 wound upon the spinning reel 39 extends through a main exit ferrule 41 formed in the front wall of the enclosure and held in position between the front wall and a further rib 42, when the two halves of the enclosure 10 are secured together and this fishing line 40 extends through the fishing rod ferrules 21, 25, 26 and 27 to operate in the usual manner.

A winding handle mechanism collectively designated 43 is secured in one side of the enclosure 10 rearwardly of the spinning reel component 39 and includes a crown gear or wheel 44 mounted upon a winding spindle 45 which extends through the said one side of the casing and terminates in a winding crank assembly 46 which is conventional. Also incorporated therewith is a star type tension member 47 and as the winding handle mechanism is conventional in all respects, it is not believed necessary to describe same further.

The spinning reel component 39 includes a reel release pin 47' having a surrounding spring 48 normally biassing the pin rearwardly in the usual manner and a small gear 49 is mounted upon this pin and engages with the crown wheel 44. Once again as all of this mechanism is conventional, it is not believed necessary to describe same further except to mention that the pin 47' has to be moved towards the front of the reel 39 in order to release the reel so that the line 40 runs freely therefrom and normally a common lever extends downwardly from the under side of the reel assembly operated by a thumb lever on the under side. However, with the construction of the rod carrying portion, it is impossible to use a conventional reel release so that reel release means collectively designated 50 is provided.

In this embodiment, a triangular member or plate 51 is pivoted by the upper corner 52 thereof upon a pivot pin 53 mounted transversely within a boss 54 moulded within the upper side of the casing and one side 55 of this triangular plate or member extends downwardly and engages the distal end of pin 47.

A lever mechanism collectively designated 56 is provided and includes a shaft 57 extending through the wall of the casing and having a finger operated lever 58 attached thereto exteriorly of the casing movable downwardly in the direction of arrow 59 (see FIGS. 1 and 6). An actuator or member engaging portion 60 is secured to the shaft within the casing and bears against another side 61 which extends from the corner 52 rearwardly at an angle from the first side 55 of the member or plate 51.

Therefore, by depressing the lever 58, the actuator 60 urges the triangular member in the general direction of arrow 62 thus end shifting the release pin 47 in a direction perpendicular to the plane of the reel thus giving an easily operated and relatively friction free operation to the reel release.

Finally, a flexible plastic cap 63 may be engaged over the ends of the rod component when in the retracted position shown in FIG. 1 and engaged over the end 19 as clearly shown in order to protect the ends of the rod.

The entire assembly may be engaged within a flexible plastic pouch, (not illustrated) and is preferably provided with aa ring 64 having a loop 65 secured thereto, and situated at the rear of the handle portion 12 so that the device may be attached to the belt of the wearer thus making it easy to transport in particular when portaging.

Although this is not to be construed as limiting, the preferred overall length of the enclosure and handle assembly as shown in FIG. 1 is approximately 12 inches from the front ferrule 27 to the rear end of the handle, when the rod components are in the fully retracted position.

With each rod section being approximately 10 inches long, the fully extended length of the entire assembly is approximately 36 inches thus giving an extremely useful and efficient angling assembly.

It will of course be appreciated that the telescopic rod assembly can be made of more or less extending portions as desired and that the reel assembly can be any conventional free flowing type of device.

In operation, the rod is extended to the extent necessary and the desired angling equipment is secured to the end of the line 40. The line is fed from the rod in the usual manner by depressing the lever 58 thus releasing the reel and as soon as winding in occurs by rotating the winder 46, the reel locks and starts winding in the line in the conventional manner.

When in the stored or retracted position, the line 40 may lie around the handle with the equipment 44 stored within the handle thus making it unnecessary to disconnect this equipment from the end of the line unless desired.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An angling assembly comprising in combination an enclosure including a reel carrying portion, a handle portion extending rearwardly from one end of said enclosure, a rod carrying portion on the upperside of said enclosure and a telescopic rod assembly in said rod carrying portion adapted to be moved from the fully extended position to an enclosed and stored position within said rod carrying portion and vice-versa, a spinning reel component mounted within said reel carrying portion, a winding handle mechanism operatively connected to said reel component and extending through the wall of said enclosure from one side thereof, and reel release means in said enclosure and also extending through the wall of said enclosure and being operatively connected to said reel component, said reel component including a reel release pin, said reel release means including a member pivoted by one end thereof in said enclosure and engaging the distal end of said reel release pin adjacent the other end of said member, and a lever mechanism extending through the wall of said enclosure, said lever mechanism comprising a finger operated lever portion exteriorly of said enclosure and a member engaging portion within said enclosure for moving said member and hence said release pin to the reel released position, said member of said reel release means comprising a substantially triangular member being pivoted to said enclosure by one corner thereof and including a release pin engaging side extending down from said one corner with a further side extending down from said one corner at an angle to said first side and being engageable by said lever mechanism whereby said release pin is moved substantially perpendicular to the plane of said reel.

2. An angling assembly comprising in combination an enclosure including a reel carrying portion, a handle portion extending rearwardly from one end of said enclosure, a rod carrying portion on the upperside of said enclosure and a telescopic rod assembly in said rod carrying portion adapted to be moved from the fully extended position to an enclosed and stored position within said rod carrying portion and vice-versa, a spinning reel component mounted within said reel carrying portion, a winding handle mechanism operatively connected to said reel component and extending through the wall of said enclosure from one side thereof, and reel release means in said enclosure and also extending through the wall of said enclosure and being operatively connected to said reel component, said handle portion constitutes a continuation of said rod carrying portion and said enclosure, said handle portion including an upper part and a lower part, said rod carrying portion and said upper part of said handle portion being detachably connected to the upper side of said enclosure and means to detachably connect said upper part of said handle portion to said upper side of said enclosure, said enclosure comprising two halves joined along the vertical plane of the longitudinal axis of said enclosure, the detachable connection of said rod carrying portion and said upper part of said handle to said upper side of said enclosure detachably securing said two halves together.

3. The assembly according to claim 2 in which said reel component includes a reel release pin, said reel release means including a member pivoted by one end thereof in said enclosure and engaging the distal end of said reel release pin adjacent the other end of said member, and a lever mechanism extending through the wall of said enclosure, said lever mechanism comprising a finger operated lever portion exteriorly of said enclosure and a member engaging portion within said enclosure for moving said member and hence said release pin to the reel released position, said member of said reel release means comprising a substantially triangular member being pivoted to said enclosure by one corner thereof and including a release pin engaging side extending down from said corner with a further side extending down from said one corner at an angle to said first side and being engageable by said lever mechanism whereby said release pin is moved substantially perpendicular to the plane of said reel.

4. The assembly according to claim 3 in which said means to detachably connect said upper part of said handle portion to said upper side of said enclosure includes a longitudinally extending cross sectional wedge-shaped male portion formed on the said upper side of said enclosure and a corresponding longitudinally extending female cross section wedge-shaped groove on the under side of said rod carrying portion whereby said rod carrying portion and the upper part of said handle portion may be slidably engaged with said enclosure and the said lower part of said handle portion, and guiding and locating means cooperatively extending between the upper part of said handle portion and an upward extension of the distal end of the lower part of said handle portion.

5. The assembly according to claim 4 which includes storage means formed in the lower part of said handle portion for storing ancilliary fishing equipment, the partial disengagement of said upper part of said handle portion with said lower part of said handle portion providing access to said storage means.

6. The assembly according to claim 2 in which said last mentioned means includes a longitudinally extending cross sectional wedge-shaped male portion formed on the said upper side of said enclosure and a corresponding longitudinally extending female cross section wedge-shaped groove on the under side of said rod carrying portion whereby said rod carrying portion and the upper part of said handle portion may be slidably engaged with said enclosure and the said lower part of said handle portion, and guiding and locating means cooperatively extending between the upper part of said handle portion and an upward extension of the distal end of the lower part of said handle portion.

7. The assembly according to claim 6 which includes storage means formed in the lower part of said handle portion for storing ancilliary fishing equipment, the partial disengagement of said upper part of said handle portion with said lower part of said handle portion providing access to said storage means.

* * * * *